(12) United States Patent
Czaloun

(10) Patent No.: US 6,282,759 B1
(45) Date of Patent: Sep. 4, 2001

(54) AUTOMATIC CABLE CLAMPING VICE

(76) Inventor: Giovanni Guntero Czaloun, Via Burgstall 1, 1-39040, Castelrotto (BZ) (IT)

( * ) Notice: Subject to any disclaimer, the term of this patent is extended or adjusted under 35 U.S.C. 154(b) by 0 days.

(21) Appl. No.: 09/483,698

(22) Filed: Jan. 14, 2000

(30) Foreign Application Priority Data

Jan. 15, 1999 (IT) .............................................. B299A0002

(51) Int. Cl.$^7$ .................................................. F16G 11/10
(52) U.S. Cl. ....................................... 24/136 R; 24/132 R
(58) Field of Search .............................. 24/136 R, 136 B, 24/115 M, 132 R, 115 R; 294/86.4; 403/211, 374.1, 334, 409.1, 374.3, 374.4; 188/65.1; 439/807, 863

(56) References Cited

U.S. PATENT DOCUMENTS

| | | | |
|---|---|---|---|
| 1,114,235 | * | 10/1914 | De Carteret . |
| 1,159,616 | * | 11/1915 | Swisher . |
| 1,507,316 | * | 9/1924 | Kemper et al. . |
| 1,564,382 | * | 12/1925 | Treiman . |
| 1,607,332 | * | 11/1926 | Adams . |
| 1,903,148 | * | 3/1933 | Swisher . |
| 1,945,000 | * | 1/1934 | Sharar . |
| 2,077,386 | * | 4/1937 | Bairley . |
| 2,700,808 | * | 2/1955 | Wells . |
| 2,849,772 | * | 9/1958 | Bukowski . |
| 3,470,528 | * | 9/1969 | Farrington Jr. et al. . |
| 4,428,100 | * | 1/1984 | Apperson . |
| 4,600,264 | * | 7/1986 | Counsel . |

\* cited by examiner

*Primary Examiner*—James R. Brittain
(74) *Attorney, Agent, or Firm*—Shlesinger, Fitzsimmons & Shlesinger

(57) ABSTRACT

An automatic cable clamping vice with insertion of the cable (1) between an upper tightening member (2) and a lower tightening member (3) anchored through an eyelet (12) is described. In accordance with the present invention the connection between the tightening members (2) and (3) takes place through the two side hinges made up of eyelets (6) and withdrawable pins (7) and (8) as well as the fact that the hinges are inclined at an angle α with respect to the axis of the cable (1) and that the hinges in addition to the rotary movement also permit longitudinal movement in such a manner that the shifting of the member (2) longitudinally with respect to the member (3) due to the cable traction also causes closing of the members (2) and (3) and therewith tightening of the interposed cable (1).

6 Claims, 1 Drawing Sheet

AUTOMATIC CABLE CLAMPING VICE

BACKGROUND OF THE INVENTION

The present invention relates to an automatic cable clamping vice e.g. of steel or another material depending on the classifying part of claim 1.

Numerous vices designed to grasp a cable by friction are known.

Essentially vices exerting for example through bolts a constant pressure on the cable and vices with automatic operation in which tightening is related to cable traction which is converted by mechanisms for example wedge-like or with lever in a pressure on the cable are distinguished. Because of the considerable forces due to coupling and friction the mechanisms used heretofore in automatic operation vices were relatively complicated and heavy. Conceptually the tightening can be provided with a system closed around the cable or a system open on the side. In the case of the closed system the stress is relatively favorable because the tightening forces are transmitted symmetrically by the upper tightening member to the lower one but on the other hand there arises the problem that the cable must be threaded by a free end into the closed system which is a requirement limiting use.

In side opening system the cable can be inserted at any point creating however a strong bending moment in the side connection between the tightening members and then having to make use of heavier structures.

Another disadvantage of numerous automatic operation vices is that once the vice is tightened it cannot be opened easily and especially at high traction values when opening even requires hammer blows.

The purpose of the present invention is to remedy the above mentioned shortcomings of the prior art by making available a vice which would have a considerably lighter structure, would have the highest operating safety and be easy to remove after use.

This purpose is achieved by the invention of a vice with characteristics in accordance with the characterizing part of claim 1.

SUMMARY OF THE INVENTION

The present invention thus concerns an automatic vice providing a tightening unit closed during operation but rapidly openable for insertion or removal of the cable from the side i.e. with no need of inserting the cable end. The vice in accordance with the present invention also permits easy removal of the cable even after strong tightening.

The vice in accordance with the present invention virtually provides two tightening members connected to each other laterally through a hinge operation system. To insert the cable the tightening system can be opened by simply pulling the pin out of one of the hinges and rotating one tightening member with respect to the other.

Tightening after insertion and tensioning of the cable takes place due to the fact that the hinge axis has an inclination α with respect to the cable axis and that the hinges, in addition to rotary motion, also permit a certain longitudinal shifting of one tightening member with respect to the other.

Longitudinal shifting of a tightening member with respect to the other caused by the cable traction given the inclination α of the hinge also causes a closing of the tightening members and therewith tightening of the interposed cable.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
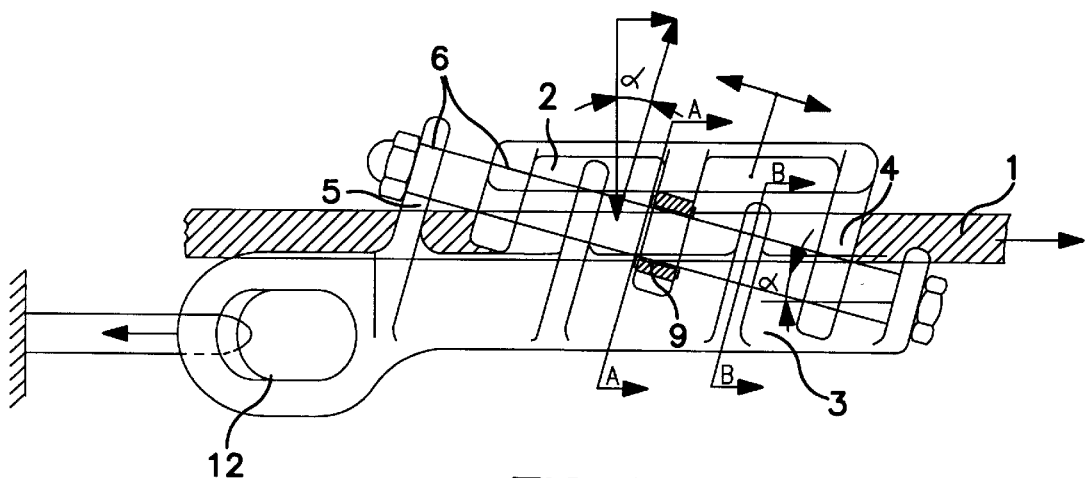
FIG. 1 shows a front view of a vice.
Figure 2:
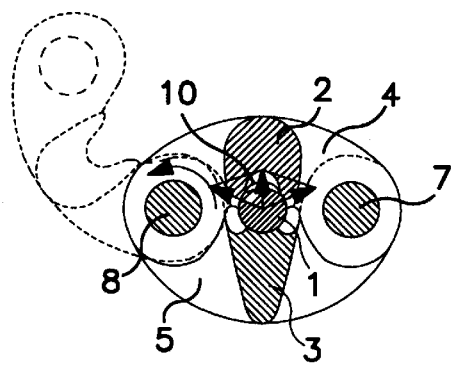
FIGS. 2, 3, and 4 show cross sections.
Figure 3:
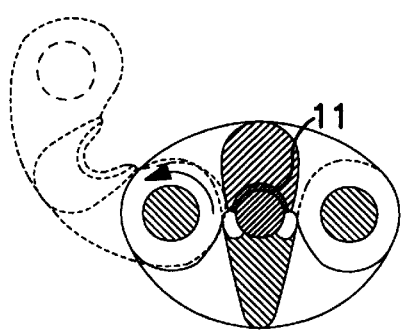
Figure 4:
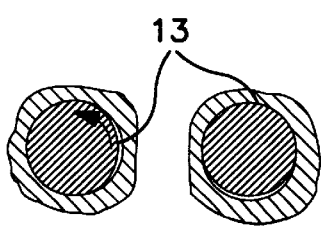

Hinges laterally connecting tightening members 2 and 3 are made up of a series of side ribs 4 and 5 with holes 6 and pins 7 and 8.

The ribs 4 and 5 form a single body with the respective tightening members. The equidistance of the ribs is chosen in such a manner as to permit the required longitudinal shifting.

To ensure automatic tightening of the vice due to the traction effect of the cable it is necessary to observe certain relationships between the inclination α, the friction coefficient of the cable towards the upper tightening member 2 and the friction coefficient of the hinge pins 7, 8 towards their housing with axial movement. The forces in play are reduced to increase the friction coefficient of the cable towards the upper tightening member 2 and reduce the friction coefficient of the pins of the hinges 7 towards this housing.

To create these condition the throat of the upper tightening member possesses preferably a trapezoidal cross section 10 which involves an effect equivalent to an increase in the friction coefficient or the throat can be coated with a low friction coefficient material.

The clamp is anchored through an eyelet 12 provided in the lower tightening member 3.

Upon applying traction the upper tightening member 2, given the high friction coefficient, shifts together with the cable while there is a slight relative movement between the cable and the lower tightening member 3. Therewith there is a longitudinal shifting between two tightening members which following the inclination α of the pins of the hinges 7, 8 also causes closing of these members i.e. clamping on the interposed cable.

As the tightening force is proportionate to cable traction of a correctly sized vice no slipping of the cable can occur.

Once tightened, the vice cannot open by itself. To facilitate opening after transaction the pin of the hinge 8 has slight side grooves 13 opposite the housing 6 in the hinge.

By turning the pin 8 approximately 90° the grooves 13 take up a position involving a slight increase in the distance between the tightening members, in this manner canceling the tension due to tightening. When this tension is eliminated the vice can be opened without effort i.e. without tools.

What is claimed is:

1. Automatic cable clamping vice with insertion of the cable between an upper tightening member and a lower tightening member anchored through an eyelet characterized in that the connection between the tightening members and takes place through two side hinges made up of eyelets and withdrawable pins and as well as the fact that the hinges are inclined at an angle α with respect to the axis of the cable and that the hinges in addition to a rotary movement to open the device also permit longitudinal movement along the length of in such a manner that the shifting of the upper tightening member longitudinally with respect to the lower tightening member due to cable traction also causes closing of the members and therewith tightening of the interposed cable.

2. Automatic vice in accordance with claim 1 wherein the eyelets of the hinges are located in ribs and that these ribs form a single body with the tightening members.

3. Automatic vice in accordance with claim 1 wherein a cable receiving in the upper tightening member has a trapezoidal cross section.

4. Automatic vice in accordance with clam 1 wherein the throat of cable provided in the upper tightening member is covered with material with high friction coefficient.

5. Automatic vice in accordance with claim 1 wherein a hinge pin housing in the upper tightening member includes sliding bushes.

6. Automatic vice in accordance with claim 1 wherein the pin of one of the hinges has opposite the eyelets of the lower tightening member slight unilateral grooves which when the pin of one of the hinges turns by approximately 90° cause withdrawal of one tightening member with respect to the other and therewith cancellation of the tightening tensions.

* * * * *